UNITED STATES PATENT OFFICE.

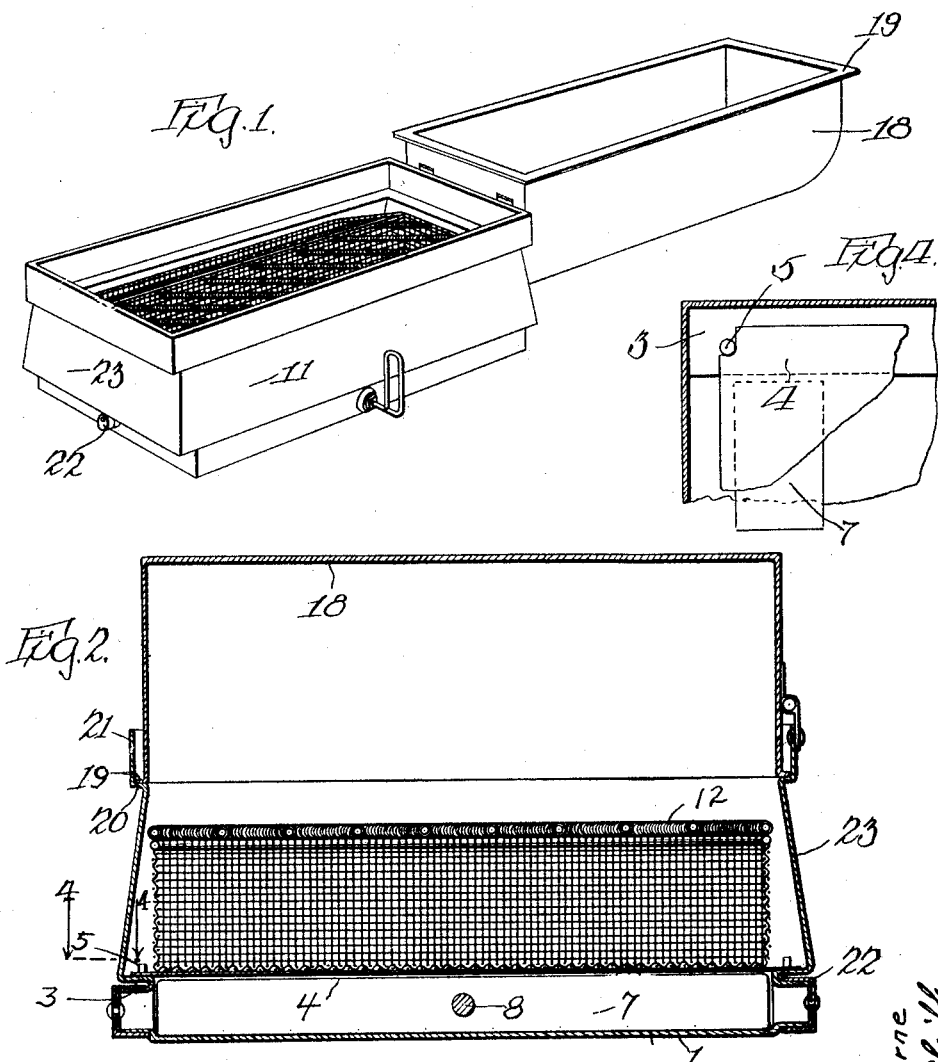

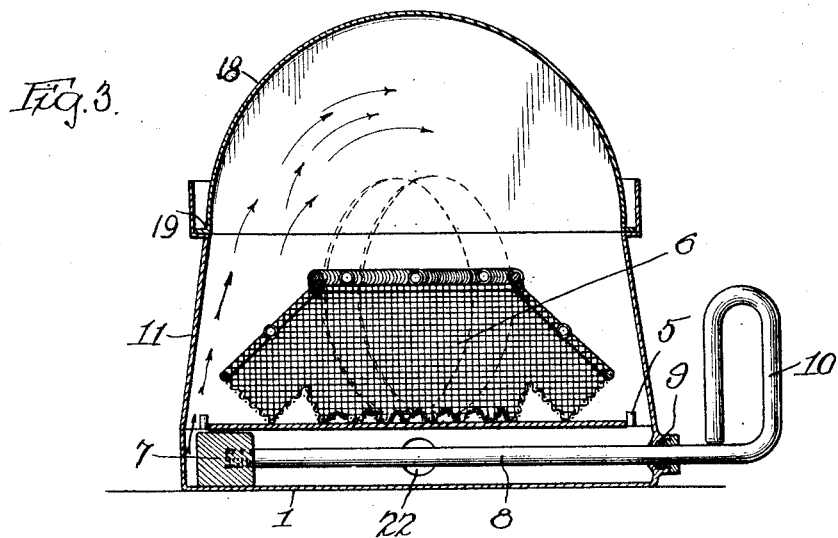
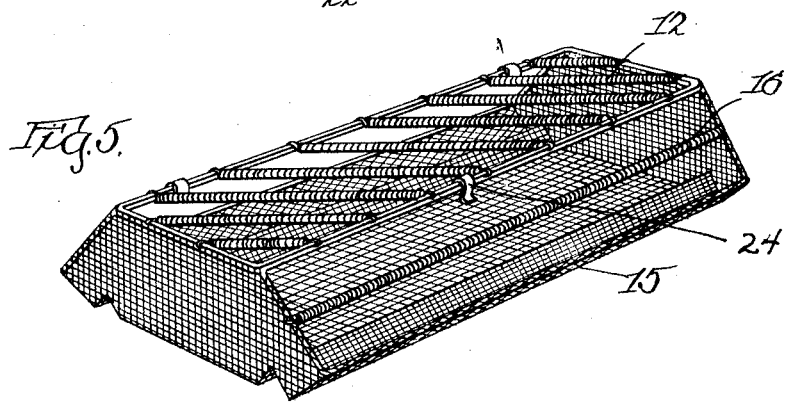

JOSEPH O'BYRNE AND MAUDE M. O'BYRNE, OF WALSENBURG, COLORADO.

DISH-WASHING MACHINE.

1,323,199.  Specification of Letters Patent.  Patented Nov. 25, 1919.

Application filed September 24, 1917. Serial No. 192,892.

*To all whom it may concern:*

Be it known that we, JOSEPH O'BYRNE and MAUDE M. O'BYRNE, both citizens of the United States, residing at Walsenburg, in the county of Huerfano and State of Colorado, have invented certain new and useful Improvements in Dish-Washing Machines; and we do hereby declare the following to be a full, clear, and exact description of the invention, such as will enable others skilled in the art to which it appertains to make and use the same.

Our invention relates to dish-washing appliances, and in its general aspect aims to provide simple, inexpensive, sanitary and easily manipulated means for washing, rinsing and drying dishes or the like without obliging the user to immerse her hands in either the suds or the rinsing water. While our invention may be embodied in types of various sizes and arranged for operation by different means, it is particularly adapted for household use and we have therefore illustrated the same in a type adapted for hand operation in an ordinary kitchen. Viewed in its more particular aspects, our invention aims to provide a dish-washing appliance which will readily enable the user to splash either the initial cleaning liquid (such as hot water containing a suitable amount of soap) or a rinsing liquid over the dishes, which will effectively hold all ordinary shapes of dishes and of table cutlery in position for thorough cleaning, which will readily permit the desired liquid to be placed in the appliance or drawn from the same, and which will permit the dishes or cutlery to be dried without additional handling. Furthermore, our invention aims to provide an appliance of this kind in which all of the parts housed by the casing when the appliance is in use may easily be removed, thereby enabling the appliance to be kept in perfectly sanitary condition; to provide simple means for splashing either the cleaning liquid or the rinsing water over the dishes from two substantially opposite directions, and to provide means for distributing the splashed water with substantial uniformity over all the dishes; to provide means for holding various shapes of dishes in such position as to effectively receive both of the oppositely directed splashes, and for this purpose to provide dish-holding means which will yield and adapt themselves to different sizes and shapes of dishes; and to provide means for holding cups or tumblers in effective position for receiving the cleansing and rinsing liquids and for automatically draining themselves. Furthermore, our invention aims to provide an appliance of this class with a casing which will automatically direct the splashed liquid over the dishes themselves without requiring deflectors or splashing members; which will enable a simple plunger to be used for forcing the liquid in either of the two opposite directions; which will confine the liquid thus moved to the desired paths, thereby preventing a waste of energy; and in which a loose plate held in position by the weight of the dishes will coöperate with the rigid portions of the casing in thus confining the liquid to the desired paths. Still further objects will appear from the accompanying drawings, and from the following specification, though we wish it understood that the appliance pictured and described therein is only one typical embodiment and that we do not wish to be limited to the particular details of the construction and arrangement thus disclosed, but broadly desire protection for the novel features as set forth in the appended claims.

Figure 1 is a perspective view of a dish-washing machine embodying our invention, with the cover swung open.

Fig. 2 is an enlarged and central vertical section taken longitudinally through the machine.

Fig. 3 is a central vertical section transversely of the machine and drawn on the same scale as Fig. 2.

Fig. 4 is an enlarged fragmentary horizontal section of a corner portion of the machine, taken along the line 4—4 of Fig. 2 showing one method of holding the false bottom in position and the relation of the splashing piston to the discharge slits.

Fig. 5 is a perspective view of the combination dish and tumbler basket shown as a part of Fig. 3.

In the embodiment of the drawings, we provide a casing having on its main portion a rectangular bottom and having sides and ends which extend vertically upward for a short distance from this bottom. Both the sides and the ends preferably are inclined inward from this point on, as shown in Figs. 1, 2 and 3, and each preferably has an offset at this juncture so as to afford a casing portion overhanging the said vertical portion of the same end. These overhanging portions afford ledges 3 for supporting the ends of a plate 4, which plate may have its corners notched to engage posts 5 upon the said ledges 3, thereby holding the edges of the plate 4 spaced from the adjacent side of the casing. The plate 4, which is thus spaced from the bottom 1 of the casing, serves as a support for a perforated container or holder, such as a wire basket 6 for holding the dishes which are to be washed. Between the false bottom 4 and the rigid bottom 1 we dispose a plunger or piston 7, preferably extending for the entire length of the bottom portion of the casing and of a height or thickness closely approaching the distance between the said two bottoms of the casing. This plunger may be reciprocated within the casing by any suitable means, such as a stem 8 extending through a stuffing box 9 on the casing and moved by manipulating a handle 10. When the appliance is to be used, the cleansing liquid (such as hot water mixed with soap suds) is poured into the bottom of the casing and desirably to a height approximating that of the compartment between the two bottoms of the casing. This may be done either before or after the loose plate or false bottom 4 is dropped into its normal position and either before or after the wire basket 6 containing the dishes is placed in position as shown in the drawings. Then upon moving the piston 7 in either direction, the liquid in the said lower compartment will be forced out ahead of the piston and through the gap or slit between one longitudinal edge of the plate 4 and the adjacent side 11 of the casing, thus causing the cleansing liquid to issue above the plate 4. In practice we preferably make the said gap or slit considerably narrower than the thickness of the piston 7, so that each movement of the plunger tends to compress the liquid ahead of the same, and the resulting pressure forces the liquid upward along one of the sides 11 with considerable force. When thus forced upward, the inward slope of the adjacent side 11 will deflect the liquid toward the center of the casing. To increase the extent of this deflection, we preferably provide the casing with an arched cover as shown in Fig. 3, thereby deflecting the liquid entirely across the casing when it is forced violently upward by the plunger. Consequently, the rapid reciprocation of the plunger will cause the liquid to be splashed alternately from opposite sides of the casing over the wire basket and the dishes contained therein. To expose the dishes effectively to the splashes from both directions, we preferably equip the basket with means for holding dishes of various shapes in desirable positions, as by providing spacers 12 stretched across the top of the basket diagonally of the sides of the latter and by equipping the bottom of the basket with formations also extending in the same diagonal direction. By so doing, we enable plates, saucers and the like to be spaced from each other and to be held vertically in planes diagonal of the casing and therefore oblique to the direction of the splashes from both sides of the casing.

This holding and spacing of the dishes may be accomplished with substantially equal facility in various ways, as for example by equipping the bottom of the wire basket with corrugations extending diagonally of the said bottom as shown in Fig. 3. These corrugations will afford a ready foothold for the plate or other dish, so as to keep the same from slipping on the bottom of the basket. To keep the plates from tipping against each other, we provide spacers extending along similarly diagonal lines across the upper opening of the basket, these spacers being preferably in the form of slender coiled springs 12, thereby permitting these spacer elements to adjust themselves in their relative spacing to dishes of varying sizes.

While the appliance above described, can be used with liquid extending above the removable plate 4, it will be obvious that by keeping the normal level of the liquid below this plate, we permit the splash of liquid to drain readily from the dishes, thereby carrying the grease, and other foreign matter with it. However, the liquid might not readily splash into, or drain out of, cups or tumblers if these were set in the same closely spaced portion of the basket with the plates and saucers. We therefore preferably provide suitable means also for holding cups and tumblers in an effective position, as shown in Figs. 3 and 5. We desirably equip the basket with longitudinal sides 15 sloping outwardly from its bottom, and with a pair of slender spiral springs 16 extending lengthwise of the basket and coöperating with the slope of the sides to hold cups or glasses in inclined positions in which their mouths face the sides of the casing. When in such a position, the splashing of the liquid will alternately strike the exterior and the interior of such dishes, and the liquid will readily drain from the same. For table cutlery, we may use any of the three compartments of the basket of Fig. 5.

To avoid a splashing of the liquid out of the casing, we preferably provide the edges of the cover 18 with outwardly directed flanges 19, which flanges normally rest upon outwardly directed flanges 20 near the mouth of the main portion of the casing. Then we equip this main portion with vertical extensions 21 forming a fence around the juncture of the said flanges 18 and 20 and thereby affording a trough around the lower portion of the cover, which trough will catch any liquid that might splash through the gap and will permit this liquid to drain back into the lower portion of the casing. To empty the liquid from the casing, we equip the bottom portion of the latter with suitable outlets 22, each of which desirably has a cap adapted to uncover and open when rotated a half turn. Such a vent is desirably placed at each end of the casing, so that the latter may readily be set upon the drain board of an ordinary kitchen sink regardless of whether this board is to the right or the left of the sink proper. By making the plate or false bottom 4 somewhat shorter than the distance between the ends of the opposite ledges upon which the plate rests, we permit it to be readily removed through the opening of the main portion of the casing. When the plate is thus removed, the stem 8 can be unscrewed from the piston 7 whereupon the stem and the piston can then be removed also, thereby rendering the entire interior of the casing accessible, so that this casing can easily be kept in a thoroughly clean and sanitary condition, which would not be feasible if the plunger moved in a chamber having rigidly fastened sides.

In operating our appliance, hot water mixed with a desired quantity of soap or washing powder is poured into the bottom of the casing to the desired height, which can easily be estimated even if the false bottom 4 is already in position. Next the first basket full of dishes is set into position upon this plate, the cover is swung over it and the plunger is reciprocated for a few minutes by manipulating the handle 10. Then the liquid, together with the grease and the like which it has carried into the lower compartment of the appliance may be drained off by opening one of the vents 22 and allowing the liquid to run directly into the adjacent sink. The vent may then be closed again, clear hot water poured into the casing, and this water may be similarly splashed over the dishes with comparatively few strokes of the plunger, thereby thoroughly rinsing the dishes, after which the cover may be swung open and the dishes can be allowed to dry right in the basket, either while still within the casing or after removing the basket from the latter. Where the dishes are considerable in quantity they may be handled in a number of successive baskets, and in any case it will be obvious that by using sufficiently hot and strong cleansing liquid and a sufficiently hot rinsing water, the dishes can be thoroughly cleaned and dried without having the hands touch them from the time they are placed in the baskets until they are removed from the latter in a cleaned and dried form. By using a plunger which extends for substantially the entire length of the casing and by forcing the water through a relatively narrow slot of the same length, we are able to secure a splashing of the liquid distributed uniformly over the whole length of the basket, any tendency toward a waste of liquid at the ends (due to the overhanging of these ends) being offset by the inward slope of the ends as shown in Figs. 1 and 2. While we have pictured and described our invention as embodied in a hand operated appliance and as including a casing having end portions overhanging the drain vents, we do not wish to be limited to these or other details of the construction and arrangement here disclosed, it being obvious that the same might be modified in many ways without departing from the spirit of our invention.

We claim as our invention:

1. In a dish-washing appliance, a covered casing adapted to contain liquid, a dish carrier, a plate supporting the dish carrier and disposed parallel with the bottom of the casing and of such size as to leave narrow openings between the sides of the casing and two opposite edges of the plate only, and a reciprocating piston slidably mounted for movement transversely of the said edges between the said plate and the said bottom to alternately expel liquid at the said opposite edges of the plate; the cross-section of the piston being greater than the opening between the casing and each of the said edges of the plate, whereby the said openings act as nozzles for causing the expelled liquid to spurt upwardly against the cover of the casing.

2. In a dish-washing appliance, a casing having opposed sides contracted laterally of the casing to afford ledges spaced from the bottom of the casing, an upper bottom resting upon the ledges and narrower than the casing, means for holding the upper bottom spaced from the opposed ends of the casing to afford slits between the ends of the upper bottom and the casing walls adjacent thereto, and a piston reciprocable between the upper and lower bottoms for forcing liquid alternately upward through the said slits.

3. In a dish-washing appliance, a container having two bottoms, affording space for liquid between them and having the upper bottom spaced from two opposite sides of the container by slits, means for supporting dishes on the upper bottom, and a piston movably disposed between the said bottoms and reciprocable for forcing liquid alternately through the said slits.

4. In a dish-washing appliance, a container having two bottoms affording space for liquid between them and having the upper bottom spaced from two opposite sides of the container by slits, means for supporting dishes on the upper bottom, and a piston movably disposed between the said bottoms and reciprocable for forcing liquid alternately through the said slits, in combination with piston-actuating means projecting through the casing; the upper bottom, piston and piston-actuating means all being manually detachable from the casing.

5. In a dish-washing appliance, a container having two bottoms affording space for liquid between them and having the upper bottom spaced from two opposite sides of the container by slits, means for supporting dishes on the upper bottom, and a piston movably disposed between said bottoms and reciprocable for forcing liquid alternately through said slits, said piston being substantially equal in length to the length of each of said slits.

Signed at Walsenburg, Colorado, September, 1917.

JOSEPH O'BYRNE.
MAUDE M. O'BYRNE.